United States Patent
Coffin

[15] 3,704,418
[45] Nov. 28, 1972

[54] TESTING OF SEMI-CONDUCTOR DEVICES

[72] Inventor: George Coffin, Streetly, England
[73] Assignee: Joseph Lucas (Industries) Limited, Birmingham, England
[22] Filed: Aug. 11, 1970
[21] Appl. No.: 62,970

[30] Foreign Application Priority Data
Aug. 11, 1969 Great Britain..........40,006/69

[52] U.S. Cl..............................324/158 F, 324/73 R
[51] Int. Cl.........................G01r 31/26, G01r 15/12
[58] Field of Search...............324/158 F, 158 P, 73 R

[56] References Cited
UNITED STATES PATENTS 3,344,351  9/1967  Simonyan et al. ........324/73 X
3,345,567  10/1967  Turner et al............324/158 P Primary Examiner—Rudolph V. Rolinec
Assistant Examiner—Ernest F. Karlsen
Attorney—Holman and Stern

[57] ABSTRACT

A method of testing a plurality of semi-conductor devices simultaneously in which the devices are placed in a testing station, at which point each device is tested and the information is stored in a memory unit, the devices then being moved to a control station, and while a second set of devices are being tested at the testing station, the memory unit operating so that an observer sees at the control station a spot of light for each faulty device, so that the faulty devices can be readily marked.

1 Claim, 1 Drawing Figure

PATENTED NOV 28 1972 3,704,418
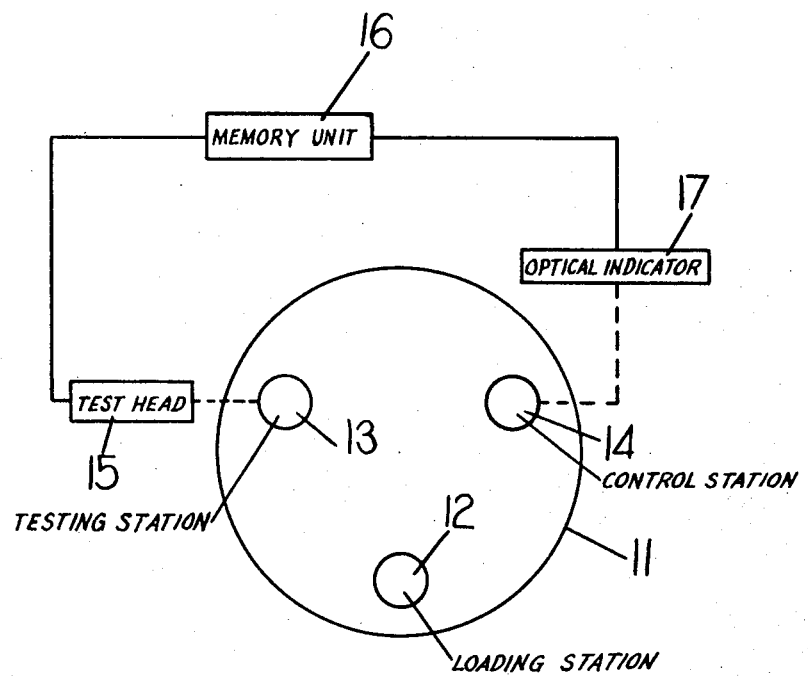
INVENTOR
George Goffin
Homans & Stern
ATTORNEYS

TESTING OF SEMI-CONDUCTOR DEVICES

This invention relates to the testing of semi-conductor devices, particularly diodes.

The invention resides in a method of testing a plurality of semi-conductor devices simultaneously in which the devices are placed in a testing station, at which point each device is tested and the information is stored in a memory unit, the devices then being moved to a control station, and while a second set of devices are being tested at the testing station, the memory unit operating so that an observer sees at the control station a spot of light for each faulty device, so that the faulty devices can be readily marked.

The invention further resides in apparatus for carrying the method described in the preceding paragraph into effect.

Usually, the devices are on a common wafer.

The accompanying drawing illustrates diagrammatically one example of the invention.

Referring to the drawing, there is provided a rotatable support 11 having three stable positions 120° apart and defining a loading station indicated at 12, a testing station indicated at 13 and a control station indicated at 14. An operator places on the support 11 at the station 12 a wafer, which in one example contains a large number of diodes, all of which have to be tested. The operator then turns the support so that the diodes are moved to the station 13, at which point a test head 15 operates to bring a plurality of probes into engagement with the diodes respectively. Each diode is then subjected to a plurality of different tests, all of which are wellknown in themselves, the information derived from the tests being fed to a memory unit 16 which may also incorporate a display unit for indicating immediately the state of each of the diodes. While the first wafer is being tested, a second wafer is loaded at the station 12, and the support 11 is then turned angularly so that the second wafer is moved to the testing station 13, and the tested wafer is moved to the control station 14. At this point the memory unit 16 operates an optical indicator 17 for showing which diode, if any, are faulty. Associated with the memory unit are a plurality of perspex rods, one for each diode being tested, and if a diode is faulty, light is transmitted along the appropriate perspex rod. The operator views the diodes through a half silvered mirror at the station 14, and the arrangement is such that any diode which is faulty will be seen to have a spot of light on it, and can be suitably marked for rejection.

Having thus described my invention what I claim as new and desire to secure by Letters Patent is:

1. Apparatus for testing a plurality of semi-conductor devices simultaneously, comprising a rotatable support incorporating a loading station for receiving successively first, second and third sets of devices, each set constituting a plurality of devices disposed in a given position, a testing station angularly spaced from the loading station on said support and including a test head having a plurality of probes, one probe for each device in a given set, for simultaneously testing respective devices in said given set, a memory unit associated with the test head for storing information derived therefrom, a control station separate and angularly spaced from the testing station on said support so that in use while a first set of devices are situated at the control station, a second set of devices can be tested at the testing station, and a third set of devices can be loaded on said support at said loading station, and an optical display unit disposed at the control station and operable by the memory unit for generating a spot of light on each faulty device in said given set, whereby any faulty devices are indicated.

* * * * *